United States Patent [19]

Torok et al.

[11] 3,989,278

[45] Nov. 2, 1976

[54] REACTIVE COLOR DEVELOPING SUBSTRATES FOR MANIFOLD COPY SYSTEMS AND PROCESS FOR PRODUCING SAME

[75] Inventors: Andrew Torok, Parsippany; Thomas F. Walsh, Florham Park, both of N.J.

[73] Assignee: Georgia Kaolin Company, Elizabeth, N.J.

[22] Filed: July 1, 1974

[21] Appl. No.: 484,392

[52] U.S. Cl. .............................. 282/27.5; 106/14.5; 106/19; 106/20; 106/288 B; 106/309; 428/913

[51] Int. Cl.[2] ...................... B41L 1/20; B41M 5/16; C08K 3/34; C09C 3/00

[58] Field of Search ...................... 106/14.5, 19–32, 106/71, 72, 286, 288 B, 308 B, 309; 117/36.2; 282/27.5; 428/913, 914

[56] References Cited

UNITED STATES PATENTS

| | | | |
|---|---|---|---|
| 3,372,043 | 3/1968 | Fanselow | 106/72 |
| 3,455,721 | 7/1969 | Phillips, Jr. et al. | 117/36.2 |
| 3,615,806 | 10/1971 | Torok et al. | 106/288 B |
| 3,622,364 | 11/1971 | Sugahara et al. | 106/288 B |
| 3,723,174 | 3/1973 | Swanson et al. | 117/36.2 X |
| 3,753,761 | 8/1973 | Sugahara et al. | 106/288 B |
| 3,849,151 | 11/1974 | Abercombie, Jr. | 106/288 B |

*Primary Examiner*—Joan E. Welcome
*Attorney, Agent, or Firm*—Buell, Blenko & Ziesenheim

[57] ABSTRACT

Improved reactive color developing substrates for manifold copy systems are produced by controlled acid treatment of smectite clay minerals, followed by severe attrition grinding to produce an aqueous colloidal suspension of the acid treated smectite. Thereupon, the colloidalized acid treated smectite is combined with an aqueous suspension of platy kaolinite, thoroughly blended and co-precipitated by the addition of appropriate flocculants such as aluminum sulfate.

14 Claims, No Drawings

REACTIVE COLOR DEVELOPING SUBSTRATES FOR MANIFOLD COPY SYSTEMS AND PROCESS FOR PRODUCING SAME

This invention relates to improved color developing substrates for manifold copy systems and process for producing the same, and particularly to reactive color developing substrates for use in manifold copy systems which utilize leuco dyes as color precursors. More specifically, the invention relates to activated smectite clay minerals to be used as receiving substrates in manifold copy systems which employ the use of microencapsulated leuco-dye solutions. Upon applied pressure, the microcapsules rupture, thereby releasing the leuco-dye solution which impinges upon the reactive smectite substrate, producing a colored image. This type of manifold copy system is described in U.S. Pat. No. 2,548,366.

The leuco-dye color precursors are of two classes:

a. Primary Color Development

These are lueco-dyes which develop intense colors immediately upon contact with a reactive substrate. Examples of this type of leuco-dye are crystal violet lactone [3,3-bis(ρ-dimethylaminophenyl)-6-dimethylphthalide] and Michelor's Hydrol.

b. Secondary Color Development

These are leuco-dyes which do not immediately develop color upon contact with a reactive substrate, but develop intense light-fast images after several hours. The most frequently used leuco-dye of this class is benzoyl leuco-methylene blue.

The activation of montmorillonites, e.g. bentonite and other clay minerals by acid leaching is well known in the art. This is thoroughly discussed in U.S. Pat. Nos. 2,464,127 and 2,981,697.

The use of acid activated montmorillonites as well as acid activated kaolins in reactive substrates for manifold copy systems is well known. This is disclosed in U.S. Pat. Nos. 3,293,060 and 3,622,364, and in British Pat. Nos. 1,232,208 and 1,307,319.

We have discovered unique reactive color developing substrates which have greater color developing capacities than heretofore available.

We have discovered that these unique superior substrates can be prepared by controlled acid leaching of smectite clay minerals. The so acid leached smectite in aqueous suspension is subjected to severe attrition grinding by means of a suitable ball mill or, preferably, a sand or bead grinder. The colloidalized acid leached smectite suspension is blended with a suspension of a well dispersed platy kaolinite. After thorough mixing of the two components, a co-precipitation or co-flocculation is achieved by the addition of aluminum, sulfate, sulfuric acid, calcium chloride or other suitable flocculating agents well described in literature, and familiar to those versed in the art.

The co-flocculated product is then recovered by filtering and drying of the solids obtained. The dried solids can be subjected to pulverization to afford better handling in application of the product.

When the reactive product prepared as described above is dispersed in water and blended with an appropriate binder such as latex (Dow 620), it can be coated on paper to form a color receiving substrate. When a solution of a primary leuco-dye such as crystal violet is contacted upon the thus coated substrate, a colored image of superior intensity is obtained.

Furthermore, we have discovered that when the coated substrate prepared as above is contacted with a solution of a secondary leuco-dye, such as benzoyl leuco-methylene blue, an intense image is obtained after several hours, which is far superior in intensity to that obtained from an acid leached smectite not prepared according to our invention. This is a very significant discovery since, heretofore, it was well known in the art that secondary dye development capacity was an inherent natural property of certain untreated smectite clay minerals which could not be enhanced by acid leaching. This is also clearly stated in U.S. Pat. No. 3,622,364 (column 8, lines 60–66).

It is also significant to note that it is well known that kaolinite is non-reactive towards development of secondary leuco-dyes and only faintly reactive towards the primary leuco-dyes. We have found, surprisingly that as much as 50% of kaolinite can be co-precipitated with colloidalized acid leached smectite with significant improvement in color image development capacity over the smectite alone.

The preferred starting materials for the product of this invention are smectite clays, preferably those smectites known as montmorillonite or bentonite. The selection of the specific montmorillonite to be used is not critical. It may be sodium or calcium montmorillonite as long as it is a commercial quality ore.

Acid activation of the montmorillonite is obtained by leaching the montmorillonite with hot dilute sulfuric or hydrochloric acid. The concentration range of anhydrous acid in water is 12 to 20%. The weight of acid used, calculated as anhydrous acid based on the weight of moisture free montmorillonite ranges 30 to 80%, preferably, 50 to 70%.

The montmorillonite is added to the dilute acid and mildly agitated while maintaining a reaction temperature range of 60° C. to 100° C. Reaction at stated temperature range is continued until a sample of rinsed reacted montmorillonite shows a hydrated silica content range of 15 to 30%. More preferably is a hydrated silica content range of 18 to 25%. The hydrated silica content is that silica which is readily soluble in a 2% sodium carbonate solution.

The completed acid leached montmorillonite is filtered free of residual acid and dissolved salts, and rinsed until substantially free of acid or soluble salts.

The rinsed acid leached montmorillonite is dispersed in water containing a dispersing agent such as sodium hexametaphosphate, tetrasodium pyrophosphate, ammonium citrate, or combinations thereof. The amount of dispersing agent added is in the range of 1 to 5%, based on the weight of moisture free acid leached montmorillonite. The % solids of montmorillonite to water is maintained in the range of 15 to 40%, preferably 20 to 30%.

The dispersed aqueous suspension of acid leached montmorillonite is subjected to intensive attrition by grinding in a sand mill or bead mill for at least five minutes or until 100% of the acid leached montmorillonite passes through a 325 mesh screen and the majority of particles are less than two microns ESD (equivalent spherical diameter). Similar results may be obtained by grinding the slurry in a ball mill for two to four hours.

A platy kaolinite of particle size 0.5 to 10 microns ESD, preferably 1 to 5 microns ESD is dispersed in water to which has been added 0.5% sodium hexametaphosphate or TSPP or other dispersing agents known in the art. The range of solids to water is 20 to 65% by weight, preferably 35 to 65% by weight.

An amount of dispersed kaolinite so calculated to be equal to 10 to 100% by dry weight of the dry basis acid activated montmorillonite is added to the colloidalized acid leached montmorillonite (i.e., 9 to 50% of the mixture on dry weight basis). The more preferred range of dry basis kaolinite is 25 to 65% of dry basis montmorillonite by weight (i.e. 20 to 38% of mixture weight). The most preferable range is 25 to 40% by weight of the dry montmorillonite (i.e. 20 to 28% of mixture weight).

The dispersed kaolinite and colloidalized acid leached montmorillonite are thoroughly blended until a homogeneous suspension is produced. Thereupon, the co-dispersed solids are co-flocculated by the addition of 0.1 to 1% of aluminum sulfate or other suitable flocculating agents.

The co-flocculated solids are dewatered by decantation or filtration, dried and pulverized.

The subject matter of this invention can, perhaps, best be understood by referring to the following examples which are illustrative of the invention and of the surprising results which may be achieved by its practice.

Test Procedures

1. Paper Coating of Reactive Substrate:

For the purpose of illustration of the utilization of the products of this invention, simple test paper coatings were prepared as follows:

| Coating Formulation | |
|---|---|
| Water | 120 grams |
| Sodium Hexametaphosphate | 4 grams |
| Reactive Product of Invention (described below) | 80 grams |
| Dow 620 Latex (binder) | 16 grams |

Test coatings were applied to sheets of paper by means of a Mayer rod so that final dried coat weight equaled 2 lbs./Book Ream.

2. Developing Color Image of Leuco-dye:

a. 1% solution of crystal violet lactone in Xylene (CVL)

b. 1% solution of benzoyl leuco-methylene blue in Xylene (BLMB)

The 1% CVL and 1% BLMB solutions are flowed onto individual sheets of paper coated with reactive product of invention. Sufficient amount of each solution is used to insure complete saturation of the reactive substrate with the leuco-dye.

3. Measurement of Developed Dye Intensity:

The reflectance optical density of each color developed sheet is determined by means of a suitable recording spectrophotometer such as a Bausch & Lomb Spectronic 505 with a reflectance attachment. Each sheet is backed with a standard Bitrol No. 1 white opaque-glass plate.

CVL Image - Reflectance Optical Density is measured at 530 nm.

BLMB Image - Reflectance Optical Density is measured at 624 nm.

EXAMPLE 1

500 grams (Dry Basis) of pulverized calcium montmorillonite from Nacogdoches, Texas were added to 350 grams of 96% sulfuric acid previously diluted with 2,000 ml. deionized water contained in a 4,000 ml. Pyrex beaker.

While maintaining continuous mild agitation, the acid-montmorillonite mixture was heated to 95° C. and held at this temperature for 12 hours, maintaining volume by addition of water as needed. At this time, the heating was discontinued, and the acid leached montmorillonite was recovered by filtration. The residual acid and acid salts were removed from the acid leached montmorillonite by continuous rinsing with fresh water until the rinse water was essentially free of soluble sulfates.

A sample of the rinsed acid leached montmorillonite was analyzed and found to contain 26% hydrated silica.

A portion of the rinsed and filtered acid leached montmorillonite was dried at 110° C. to 10% moisture content. The dried filter cake was pulverized to a fineness of 95% thru 200 mesh. This sample was designated Sample 1A.

Another portion of the rinsed acid leached montmorillonite filter cake was diluted with water to 20% solids. 1% of sodium hexametaphosphate, based on solids, was added to the dispersion. This fluid dispersion was introduced into a bead grinder which was charged with 10–20 mesh alumina beads. Attrition grinding of the acid leached montmorillonite was accomplished by agitating the bead-montmorillonite slurry mixture at 600 R.P.M. for 5 minutes. At this time, the montmorillonite slurry was separated from the grinding media and passed through a vibrating 325 mesh screen. Essentially, no residue remained on the 325 mesh screen. A particle size analysis of the attrition ground product showed it to be 100% less than 2 micrometers ESD.

In a separate container, 200 grams of a platy kaolinite known as Kaopaque 20 (Georgia Kaolin Company) were dispersed in 300 ml. of deionized water containing 1 gram of dissolved sodium hexamethaphosphate.

750 grams of the slurry from Step 4 were blended with 93.8 grams of slurry from Step 5. This resulting mixture contained 150 grams of dry basis colloidalized acid leached montmorillonite and 37.5 grams, dry basis Kaopaque 20.

The mixture was well blended by agitation, and the solids were co-flocculated by the addition of 10 ml. of a 10% solution of aluminum sulfate.

The co-flocculated product was dewatered by filtration, dried at 110° C. and pulverized. This sample was designated Sample 1B.

Paper coatings were prepared with Samples 1A and 1B as outlined in test procedures above. CVL and BLMB images were developed on each sample coating, and the optical density of the colored images were determined according to test procedures. Results are recorded in Table I.

EXAMPLE 2

500 grams (Dry Basis) of pulverized calcium bentonite from Muldoon, Texas were treated according to Example 1. Samples were designated 2A and 2B. CVL and BLMB images were developed on each sample coating, and optical density of the colored images were determined according to test procedures. Results are recorded in Table I. The hydrated silica content of samples 2A was 22%.

EXAMPLE 3

Same as Example 1, except a calcium bentonite from Amory, Mississippi was used. Samples were designated 3A and 3B. Results are recorded in Table I.

Sample 3A hydrated silica content was 25%.

EXAMPLE 4

Same as Example 1, except a calcium-magnesium bentonite from Twiggs County, Georgia was used. Samples were designated 4A and 4B. Results are recorded in Table I.

Sample 4A hydrated silica content was 19%.

EXAMPLE 5

Same as Example 1, except a sodium montmorillonite from Casper, Wyoming, was used as starting material for acid activation. Samples were designated 5A and 5B. Results are recorded in Table I.

Sample 5A had a hydrated silica content of 28%.

Table I

| Sample Number | Color Image | Optical Density | % Image Improvement $\frac{OD_B - OD_A (100)}{OD_A}$ |
|---|---|---|---|
| 1A | CVL | 0.545 | |
| 1B | CVL | 0.686 | 25.9 |
| 1A | BLMB | 0.630 | |
| 1B | BLMB | 0.766 | 21.5 |
| 2A | CVL | 0.489 | |
| 2B | CVL | 0.664 | 35.8 |
| 2A | BLMB | 0.166 | |
| 2B | BLMB | 0.239 | 44.0 |
| 3A | CVL | 0.647 | |
| 3B | CVL | 0.797 | 23.2 |
| 3A | BLMB | 0.310 | |
| 3B | BLMB | 0.429 | 38.4 |
| 4A | CVL | 0.335 | |
| 4B | CVL | 0.618 | 84.0 |
| 4A | BLMB | 0.081 | |
| 4B | BLMB | 0.252 | 76.0 |
| 5A | CVL | 0.517 | |
| 5B | CVL | 0.675 | 30.6 |
| 5A | BLMB | 0.398 | |
| 5B | BLMB | 0.502 | 26.0 |

While we have illustrated and described certain preferred practices and embodiments of our invention in the foregoing specification, it will be understood that this invention may be otherwise embodied within the scope of the following claims.

We claim:

1. An improved reactive color developing substrate for manifold copy systems comprising a co-flocculated mixture of colloidalized acid treated smectite having a hydrated silica content in the range 15% to 30% admixed with about 9% to 50% by weight of platy kaolin in the size range 0.5 to 10 microns and the balance said acid treated smectite equivalent spherical diameter.

2. An improved reactive color developing substrate for manifold copy systems as claimed in claim 1 wherein the acid treated smectite has a particle size less than 325 mesh.

3. An improved reactive color developing substrate for manifold copy systems as claimed in claim 1 wherein the platy kaolin has a particle size range from about 1 to 5 microns equivalent spherical diameter.

4. An improved reactive color developing substrate for manifold copy systems as claimed in claim 1 wherein the acid treated smectite has a particle size less than 325 mesh and the platy kaolin has a size in the range about 1 to 5 microns equivalent spherical diameter.

5. An improved reactive color developing substrate for manifold copy systems as claimed in claim 1 wherein the kaolin is about 20 to 38% by weight of the mixture.

6. An improved reactive color developing substrate for manifold copy systems as claimed in claim 1 wherein the kaolin is about 20 to 28% by weight of the mixture.

7. An improved reactive color developing substrate paper for manifold copy systems comprising a paper sheet, a coating on one side of said paper sheet comprising a co-flocculated mixture of colloidalized acid treated smectite with about 9 to 50% by weight of platy kaolin and an effective amount of a paper coating adhesive.

8. An improved reactive color developing substrate paper for manifold copy systems as claimed in claim 7 wherein the acid treated smectite has a particle size less than 325 mesh and the platy kaolin has a particle size in the range about 0.5 to 10 microns equivalent spherical diameter.

9. A process for making an improved reactive color developing substrate comprising the steps of:

a. acid leaching smectite to a hydrated silica content in the range 15 to 30%, using a concentration of anhydrous acid to water of about 12 to 30%, a reactive temperature of about 60° C. to 100° C., b. grinding the acid leached smectite to less than 325 mesh, c. dispersing a kaolin having a particle size in the range 0.5 to 10 microns ESD in water, to form a slurry having 20 to 65% solids by weight, d. adding to the dispersed kaolin an amount of ground acid leached smectite such that the kaolin forms 9% to 50% of the mixture by weight, e. co-flocculating the smectite and kaolin from the dispersion, by the addition of about 0.1 to 1% of a suitable dispersing agent, f. recovering the co-flocculated smectite and kaolin, and g. drying the recovered co-flocculated smectite and kaolin.

10. A process as claimed in claim 9 wherein the kaolin is dispersed in the presence of a dispersion agent.

11. A process as claimed in claim 9 wherein the smectite-kaolin mixture contains 20 to 38% by weight kaolin.

12. A process as claimed in claim 9 wherein the smectite-kaolin mixture contains 20 to 28% by weight kaolin.

13. A process as claimed in claim 9 wherein the dispersed mixture of smectite and kaolin is co-flocculated by the addition of a flocculating agent.

14. A process as claimed in claim 13 wherein the flocculating agent is aluminum sulfate.

* * * * *

UNITED STATES PATENT OFFICE
CERTIFICATE OF CORRECTION

PATENT NO. : 3,989,278

DATED : November 2, 1976

INVENTOR(S) : ANDREW TOROK and THOMAS F. WALSH

It is certified that error appears in the above-identified patent and that said Letters Patent are hereby corrected as shown below:

Column 1, line 22, "lueco-dyes" should read --leuco-dyes--.

Column 4, line 68, under the heading "EXAMPLE 2", "samples" should read --sample--.

Column 6, Claim 9, line 37, "ESD" should read --equivalent spherical diameter--.

Signed and Sealed this

Fifteenth Day of March 1977

[SEAL]

*Attest:*

RUTH C. MASON
*Attesting Officer*

C. MARSHALL DANN
*Commissioner of Patents and Trademarks*